United States Patent [19]

Ligh

[11] Patent Number: 5,511,581
[45] Date of Patent: Apr. 30, 1996

[54] VENT VALVE

[76] Inventor: Jone Y. Ligh, P.O. Box 420509, Houston, Tex. 77242-0509

[21] Appl. No.: 331,853

[22] Filed: Oct. 31, 1994

[51] Int. Cl.⁶ ................................................. F16K 31/385
[52] U.S. Cl. .................................................. 137/489; 251/88
[58] Field of Search .................................. 137/488, 489; 251/63.4, 88

[56] References Cited

U.S. PATENT DOCUMENTS

| 2,848,187 | 8/1958  | Henry          | 251/85     |
| 4,019,713 | 4/1977  | Deinlein-Kalb  | 251/63.4 X |
| 4,699,175 | 10/1987 | Anderson et al.| 137/488 X  |
| 4,705,065 | 11/1987 | McNeely et al. | 137/488 X  |
| 4,722,360 | 2/1988  | Odajima et al. | 137/489 X  |

OTHER PUBLICATIONS

The Protectoseal Company Catalog, 1990. Exhibit A–F.
Anderson Greenwood & Company Catalog, 1989. Exhibit H–L.
Groth Equipment Corporation Catalog, 1987. Exhibit M–N.

Primary Examiner—Stephen M. Hepperle
Attorney, Agent, or Firm—Kenneth H. Johnson

[57] ABSTRACT

A tank vent valve for use with a pilot valve that comprises a vent valve body containing a nozzle, a seat plate movable within said vent valve body which seats on said nozzle to seal the valve, and an articulated stem extending from the center of said seat plate and a diaphragm actuator mounted on said vent valve body comprising a resilient member, a support plate below said resilient member and a hollow member attached to said support plate extending toward said seat plate and surrounding said stem, said stem being slidably movable within said hollow member, the upper surface of said diaphragm being in fluid communication with the pressure in said tank through a pilot valve. The stem is terminated in a ball and socket arrangement so that the valve will still seat if the stem is slightly misaligned.

19 Claims, 2 Drawing Sheets

VENT VALVE

BACKGROUND OF THE INVENTION

1. Field of the Invention

The present invention generally relates to a tank venting valve for relieving the internal pressure in tanks at a predetermined pressure. More particularly the invention relates to a pilot operated tank vent valve.

2. Related Art

There are several types of pressure relief valves for atmospheric or low pressure storage tanks. One of the basic designs is known as a "weight loaded tank vent". The design utilizes a weighted cover over a nozzle. The cover, also known as a pallet, forms a barrier to the nozzle opening. The weight of the pallet determines at what pressure the pallet will lift open to relieve pressure in the tank. The opening pressure is known as the "set pressure". The set pressure can easily be determined by dividing the weight of the pallet assembly by the open area of the nozzle. If a higher set pressure is desired more weight is added to the pallet.

Another type of pressure relieving device is a spring loaded tank vent. The spring loaded type is used for set pressures above that which is practical for weight loaded operation due to either a high set pressure where there is not enough room for the weights on the pallet, or where the size of the vent nozzle dictates a very heavy weight on the pallet.

A third type of tank vent is pilot operated. Pilot operated tank vents utilize the tank pressure acting on an area larger than the nozzle area to create a higher downward force to hold down a pallet or seat plate against the tank pressure. For this reason pilot operated tank vents seal tighter than weight or spring loaded vents until the set or opening pressure is reached. The set pressure is adjustable by means of a spring in the pilot.

Any of the three types may be vented to the atmosphere or piped into headers for vapor recovery or burning.

It is a particular feature of the present vent valve that it is adapted for use with a pilot valve. It is an advantage of the present vent valve that the main valve automatically prevents back flow in the event the outlet header pressure is higher than the tank pressure. A further advantage of the present vent valve is that the main valve will open substantially at the set pressure even with varying pressure in the outlet header, whether the header pressure is positive (above zero gauge) or negative (below zero gauge). It is a further advantage that the present vent valve is modular in the components of the valve, actuator and associated pilot valve. These and other features and advantages will become apparent from the following descriptions.

SUMMARY OF THE INVENTION

Briefly the present invention provides a tank vent valve for use with a pilot valve that comprises:

(a) a vent valve body containing
  (i) a nozzle,
  (ii) a seat plate movable within said vent valve body which seats on said nozzle to seal the valve, and
  (iii) an articulated stem extending from the center of said seat plate and
(b) a diaphragm actuator mounted on said vent valve body comprising a resilient member, a support plate below said resilient member and a hollow member attached to said support plate extending toward said seat plate and surrounding said stem, said stem being slidably movable within said hollow member, the upper surface of said diaphragm being in fluid communication with the pressure in said tank through a pilot valve.

PREFERRED EMBODIMENT

Figure 1:
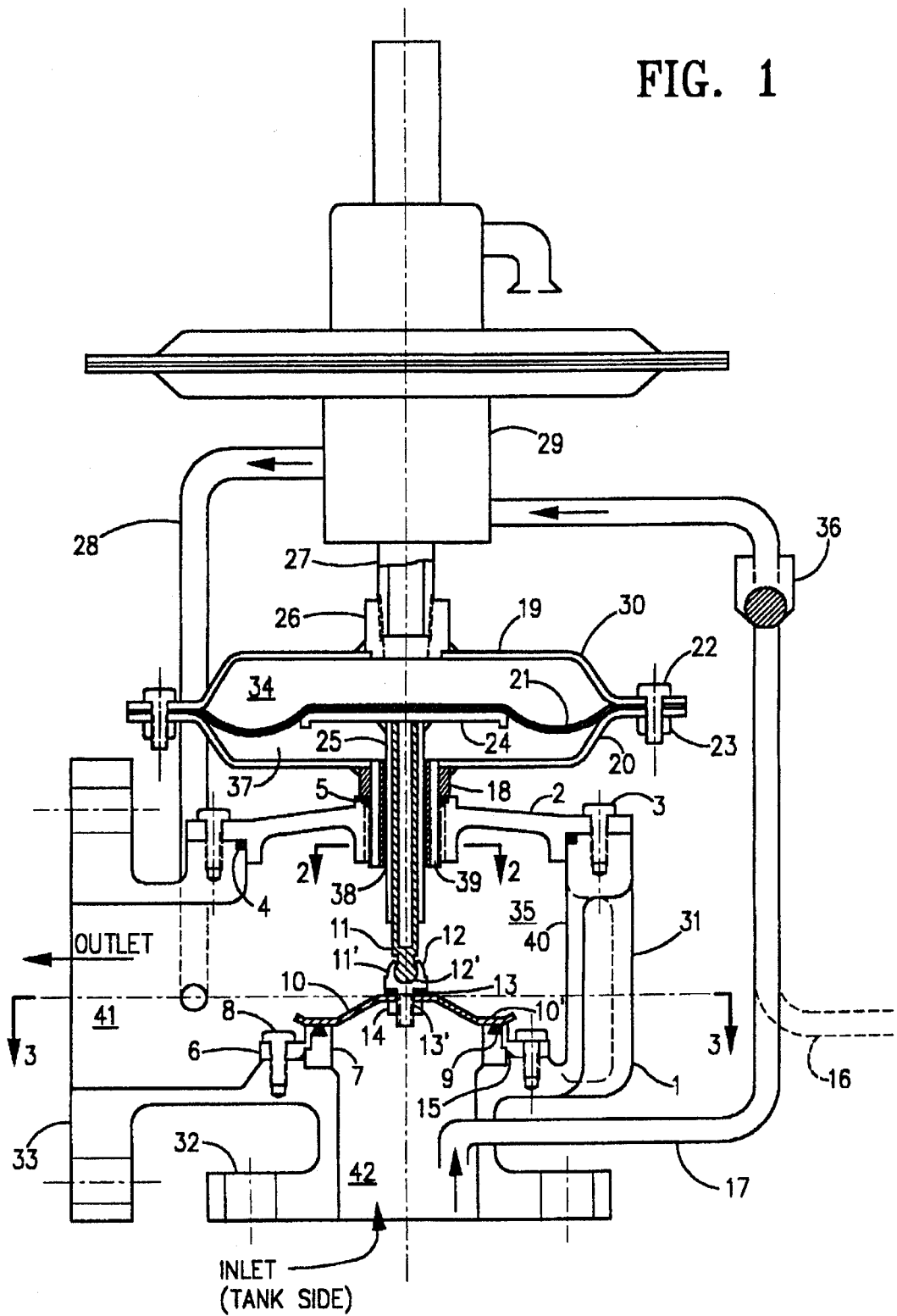
FIG. 1 is an elevational view in partial cross section of one embodiment of the invention.
Figure 2:
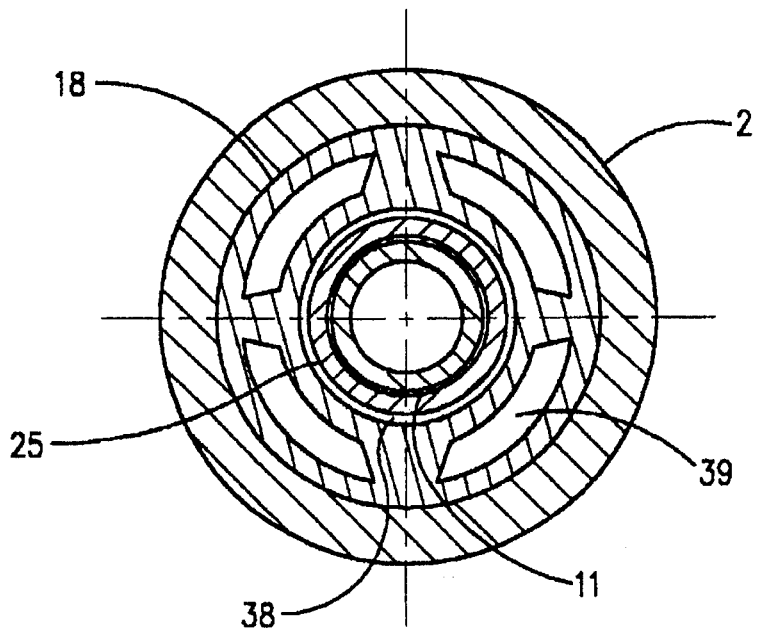
FIG. 2 is a cross sectional view along line 2—2 of FIG. 1.
Figure 3:
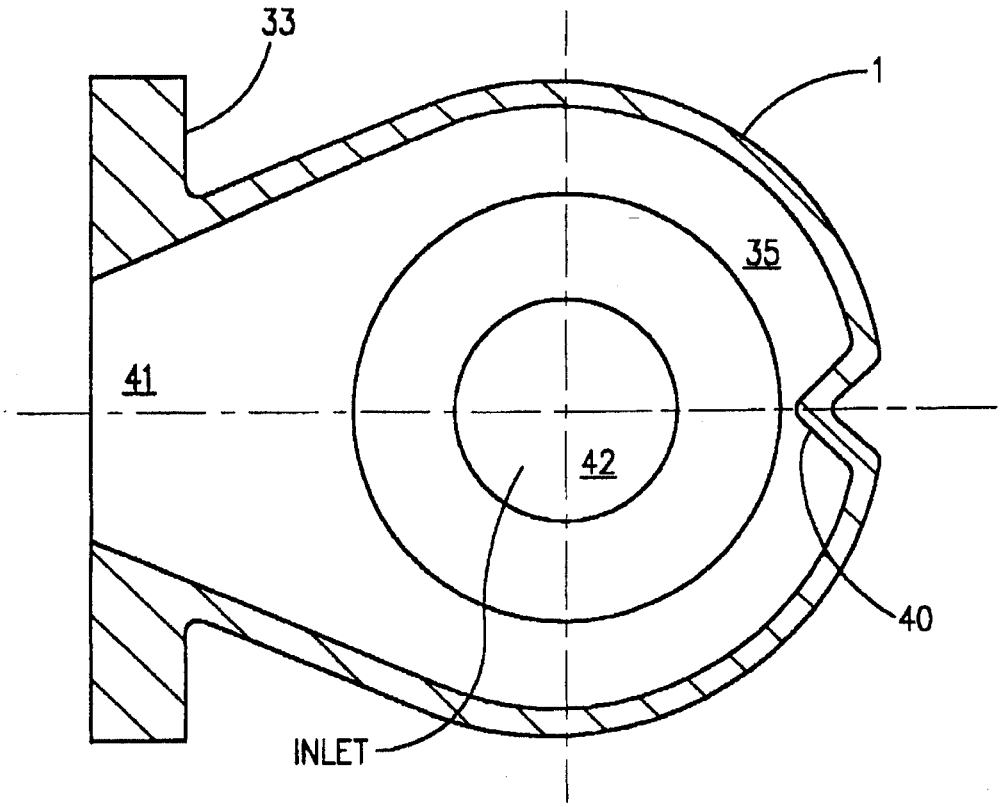
FIG. 3 is a cross sectional view along line 3—3 of body 1 of FIG. 1.

A detailed description of a preferred embodiment is provided by reference to FIG. 1 which shows an elevational view in partial cross section of one embodiment of a pilot operated tank vent valve.

The pilot 29 is connected to the actuator 30 with a pipe nipple 27. The actuator is connected to the main valve 31 through the use of a threaded adapter 18. The main valve 31 internals may be accessed by removing the bolts 3 and lifting the cap 2 and everything that is attached to it without disturbing either the pilot or actuator. By removing the pilot at nipple 27 and detaching the actuator from the main valve at adapter 18, the actuator may be disassembled without disturbing either the pilot 29 or main valve assembly 31.

The actuator 30 comprises upper case 19, lower case 20, diaphragm 21, support plate 24, guide tube 25, coupling 26, bolts 22, nuts 23, adapter 18, pressure chamber 34, lower actuator chamber 37, and bore 38. Coupling 26 is attached to upper case 19. Adapter 18 is attached to lower case 20. Guide tube 25 is attached to support plate 24, but not attached to stem 11 of the main valve. Diaphragm 21 bears against support plate 24 but is not attached to it.

The main valve 31 comprises body 1, cover 2, bolts 3, seal 4, seal 5, seat ring retainer 6, seat ring 7, bolts 8, seat seal 9, seat plate 10, stem 11, self-aligning fitting 12, gasket 13, nut 14, seal 15, inlet connector 32, and outlet connector 33. The groove for seal 9 may be machined in the body 1, thus eliminating the seat ring retainer 6, seat ring 7, bolts 8, and seal 15. Positioned opposite the outlet 41 is flow director 40, which in this embodiment is an angular projection fabricated into the body 1. The flow through the body 1 is shown by the arrows.

The pilot valve may be any of those available such as U.S. Pat. No. 4,991,620 and in particular that described in U.S. patent application Ser. No. 08/224,797 filed Apr. 8, 1994, which is incorporated herein in its entirety.

Pressure pickup to the pilot valve 29 may be either tube 16 for remote sensing or tube 17 for internal sensing within the inlet 42 of body 1 of the main valve assembly 31. Check valve 36 (a valve that allows flow in one direction but not the other) may be used if it is desirable not to have fluid from the outlet header seeping back through the pilot into the tank in the event the header pressure is higher than the tank pressure.

The main valve assembly 31 is attached to the tank (not shown) by inlet connector 32. The pallet or seat plate 10 seats on seat seal 9 which is mounted annularly about the upper surface of the seat ring 7. The seal 9 is kept in place by seal retainer 6 which is bolted to the main valve assembly 31 with bolts 8, which components comprise a ring seal seat assembly and form the nozzle against which the seat plate rests.

The seat plate 10 is stamped from light metal to allow more sensitivity in the low pressure setting. A dome shape is used for strength having an annular lip 10' which is the actual seating surface. The seat plate 10 is attached at its center through an opening 13' to self-aligning fitting 12 by nut 14 which tightens the fitting 12 against sealing gasket 13.

Stem 11 terminates in ball 11' which seats in round seat 12' within the fitting 12. The arrangement allows for articulation of the stem 11 thus self-aligning the stem. The stem 11 slides in guide tube 25, there being a positive action only when diaphragm 21 is pressing downward.

The actuator 30 is mounted to the body 1 by threadable engagement of adapter 18 at seal 5. The adapter is welded to the lower case 20. The tube 25 slides in bore 38 in response to the diaphragm 21 (downward) or the seat plate 10 (upward). The bore 38 is not sealed from the header pressure. Passages 39 which extend through the adapter 18 along the same plane as the bore also allow fluid communication between chamber 35 and chamber 37. The tube 25 is welded to plate 24.

The upper case 19 is sealed by nuts 23 and bolts 22 to the lower case 20, with the diaphragm serving to seal the pressure chamber 34.

The pilot valve 29 is threadably engaged into coupling 26 which is wielded to the upper case 19. Any pilot valve which is adapted to communicate the tank pressure to the upper chamber 34 is suitable.

Tank pressure is sensed by either remote pressure pickup tube 16 or internal pressure pickup tube 17 in the main valve and directed to the pilot inlet port. The pressure is directed through the pilot into the actuator pressure chamber 34 tending to push downward against the diaphragm 21 which in turn is pushing downward against the main valve stem 11 tending to force the seat plate 10 against the seat seal 9. Tank pressure is also acting upward against the seat plate 10. Because the downward effective area of the actuator diaphragm 21 is designed to be greater than the area of the main valve seat within seal 9, the net force is downward when pressure in the actuator pressure chamber 34 is equal to the pressure at the main valve inlet (nozzle) defined by elements 6 and 7, thus closing the valve. As long as the pressure in the tank is insufficient to open the pilot, the pilot and main valve will remain closed. When the tank pressure is sufficiently high to open the pilot to allow flow through the pilot (the set pressure), this flow will create a drop in pressure in the actuator pressure chamber 34 due to pressure escaping from this chamber through the pilot discharge port. With a drop in pressure in chamber 34 the downward force on the actuator support plate 24 is also reduced. When pressure in the actuator pressure chamber 34 is reduced sufficiently, the main valve seat plate 10, with the full tank pressure pushing upward, will be able to lift and open to allow the discharge of excess tank pressure. When the excess pressure has been discharged and the tank pressure falls below the set pressure the pilot valve will close. This in turn will increase the pressure in the actuator pressure chamber 34 until it equals the tank pressure. The main valve will be able to shut off as explained previously.

In a pipe away configuration the outlet side of the vent valve and the pilot outlet (if connected to the header or outlet side of the valve) are subject to the header pressure. If the header pressure is positive and higher than the tank pressure, the higher pressure on the top side of the main valve seat plate 10 will keep the valve closed, thus acting as a back flow preventer. The pressure on the bottom side of the actuator diaphragm, transmitted from the main valve outlet chamber 35 to the lower actuator chamber 37 via bore 38 and passages 39 extending through the adapter 18, being higher than the pressure on the top side, will tend to lift the diaphragm. But since the diaphragm is not attached to the valve stem 11 directly or indirectly it will not lift open the valve to allow back flow into the tank.

If the header pressure is negative (vacuum) it tends to lift up the seat plate 10. However, negative pressure on the lower side of the actuator diaphragm (lower actuator chamber) tends to increase the downward force on the valve stem 11 to prevent it from lifting since the actuator diaphragm has a larger downward effective area than the seat plate 10. Therefore negative header pressure alone will not cause the valve to open before the tank pressure reaches the set pressure of the pilot.

By not attaching the actuator diaphragm 21 directly or indirectly to the stem 11, the header pressure (positive or negative) has virtually no effect on the set pressure of the valve.

It is desirable for a pressure venting device to fail in the open mode if any of its components fail. The most vulnerable component in the actuator is the diaphragm. If the diaphragm ruptures, pressure will be lost through the tear. Without sufficient pressure in chamber 34 to hold down the main valve seat plate against the inlet pressure, the seat plate will lift to relieve tank pressure, thus failing in the open position.

The invention claimed is:

1. A tank vent valve for use with a pilot valve that comprises:
    (a) a vent valve body containing:
        (i) a nozzle,
        (ii) a seat plate movable within said vent valve body which seats on said nozzle to seal the valve,
        (iii) an articulated stem extending from the center of said seat plate and
        (iv) an outlet and
    (b) a diaphragm actuator mounted on said vent valve body comprising a resilient member, a support plate below said resilient member such that said resilient member bears upon but is not connected to said support plate and a hollow member attached to said support plate extending toward said seat plate and surrounding said stem, said stem being slidably movable within said hollow member, the upper surface of said diaphragm being in fluid communication with a pressure in said tank through a pilot valve, and the lower surface of said diaphragm being in fluid communication with a pressure at said outlet.

2. The vent valve according to claim 1 wherein the lower end of said stem is in the form of a ball and is received in a socket on the upper surface of said seat plate such that said seat plate will seal said nozzle if said stem is not in perfect alignment.

3. The vent valve according to claim 1 wherein the vent valve discharges to a manifold.

4. The vent valve according to claim 1 wherein said body has a fitting for attachment to a tank.

5. The vent valve according to claim 1 wherein said seat plate is dome shaped.

6. The vent valve according to claim 1 wherein said nozzle is an integral part of said body.

7. The vent valve according to claim 1 wherein said hollow member extends through an opening in said body.

8. The vent valve according to claim 7 wherein said hollow member is slidably movable in said opening.

9. The vent valve according to claim 1 wherein said diaphragm forms a sealed chamber to said pressure in said tank.

10. The vent valve according to claim 1 further comprising a pilot valve attached to said actuator.

11. The vent valve according to claim 10 wherein the lower end of said stem is in the form of a ball and is received in a socket on the upper surface of said seat plate such that said seat plate will seal said nozzle if said stem is not in perfect alignment.

12. The vent valve according to claim 10 wherein the vent valve discharges to a manifold.

13. The vent valve according to claim 10 wherein said body has a fitting for attachment to a tank.

14. The vent valve according to claim 10 wherein said seat plate is dome shaped.

15. The vent valve according to claim 10 wherein said nozzle is an integral part of said body.

16. The vent valve according to claim 10 wherein said hollow member extends through an opening in said body.

17. The vent valve according to claim 16 wherein said hollow member is slidably movable in said opening.

18. The vent valve according to claim 10 wherein said diaphragm forms a sealed chamber to said pressure in said tank.

19. A tank vent valve for use with a pilot valve that comprises:

(a) a vent valve body containing:
  (i) a nozzle,
  (ii) a seat plate movable within said vent valve body which seats on said nozzle to seal the valve, and
  (iii) an articulated stem extending from the center of said seat plate and
  (iv) an outlet and
(b) a diaphragm actuator mounted on said vent valve body comprising
  (i) an upper case connected to a lower case to define a chamber,
  (ii) a resilient diaphragm disposed within said chamber between said cases to divide said chamber into an upper chamber and a lower chamber, said upper chamber being in fluid communication with the pressure in said tank through a pilot valve and said lower chamber being in fluid communication with the pressure at said outlet,
  (iii) a support plate disposed below said diaphragm such that diaphragm bears upon said support plate but not attached thereto, and
  (iv) a hollow member attached to said support plate extending toward said seat plate and surrounding said stem, said stem being slidably movable within said hollow member.

* * * * *